United States Patent
Liang et al.

(10) Patent No.: US 12,169,340 B2
(45) Date of Patent: Dec. 17, 2024

(54) ELECTRONIC DEVICE WITH A TRANSPARENT ELECTRODE AND A SIGNAL LINE ELECTRICALLY CONNECTED THERETO

(71) Applicant: InnoLux Corporation, Miao-Li County (TW)

(72) Inventors: Ting-Wei Liang, Miao-Li County (TW); Jiunn-Shyong Lin, Miao-Li County (TW); I-An Yao, Miao-Li County (TW); Tzu-Chieh Lai, Miao-Li County (TW); Chung-Chun Cheng, Miao-Li County (TW); Shih-Che Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/164,000

(22) Filed: Feb. 3, 2023

(65) Prior Publication Data

US 2023/0305343 A1    Sep. 28, 2023

Related U.S. Application Data

(60) Provisional application No. 63/323,109, filed on Mar. 24, 2022.

(30) Foreign Application Priority Data

Sep. 15, 2022   (CN) .......................... 202211122026.4

(51) Int. Cl.
*G02F 1/1343* (2006.01)
*G02F 1/1335* (2006.01)
(Continued)

(52) U.S. Cl.
CPC .... *G02F 1/13439* (2013.01); *G02F 1/133512* (2013.01); *G02F 1/134309* (2013.01); *G02F 1/1345* (2013.01); *G02F 1/13478* (2021.01)

(58) Field of Classification Search
None
See application file for complete search history.

(56) References Cited

U.S. PATENT DOCUMENTS 5,212,575 A * 5/1993 Kojima ............. G02F 1/134336
349/147
5,828,434 A * 10/1998 Koden ............. G02F 1/133512
349/110
(Continued)

FOREIGN PATENT DOCUMENTS

CN        112882300 A      6/2021
TW        201213971 A      4/2012

OTHER PUBLICATIONS

Chinese language office action dated May 4, 2023, issued in application No. TW 111134883.

*Primary Examiner* — Ryan Crockett
(74) *Attorney, Agent, or Firm* — McClure, Qualey & Rodack, LLP

(57) ABSTRACT

An electronic device is provided. The electronic device includes a first panel. The first panel includes a first substrate, a second substrate, a liquid crystal layer, a first transparent electrode, a second transparent electrode, and a first signal line. The second substrate is opposite to the first substrate. The liquid crystal layer is disposed between the first substrate and the second substrate. The first transparent electrode is disposed between the first substrate and the liquid crystal layer. The second transparent electrode is disposed between the second substrate and the liquid crystal layer. The first signal line is electrically connected to the first transparent electrode and extending along a first direction.

(Continued)

The impedance of the first signal line is less than the impedance of the first transparent electrode.

18 Claims, 13 Drawing Sheets

(51) Int. Cl.
*G02F 1/1345* (2006.01)
*G02F 1/1347* (2006.01)

(56) References Cited

U.S. PATENT DOCUMENTS

| | | |
|---|---|---|
| 8,384,851 B2 | 2/2013 | Nirmal et al. |
| 11,327,375 B2 | 5/2022 | Liao et al. |
| 2004/0114087 A1* | 6/2004 | Cho .................. G02F 1/133514 |
| | | 349/155 |
| 2005/0117092 A1* | 6/2005 | Park .................... G02F 1/13394 |
| | | 349/106 |
| 2010/0201933 A1* | 8/2010 | Sonoda ............. G02F 1/133305 |
| | | 349/141 |
| 2012/0249929 A1* | 10/2012 | Fukuda ............... G02F 1/13718 |
| | | 359/263 |
| 2012/0268699 A1* | 10/2012 | Min .................... G02F 1/13394 |
| | | 349/106 |
| 2014/0049717 A1* | 2/2014 | Kwak ............... G02F 1/133512 |
| | | 438/30 |
| 2019/0033628 A1* | 1/2019 | Kawata ............... G02F 1/13394 |
| 2019/0157304 A1* | 5/2019 | Miyamoto .......... H01L 27/1248 |
| 2024/0045281 A1* | 2/2024 | Kim .................. G02F 1/134372 |

* cited by examiner

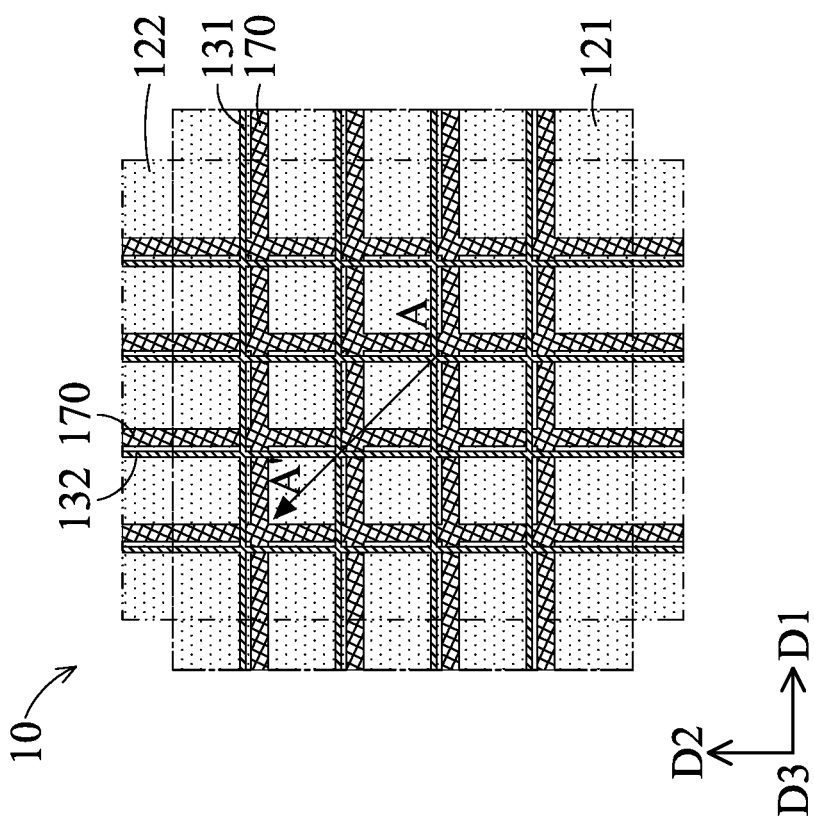
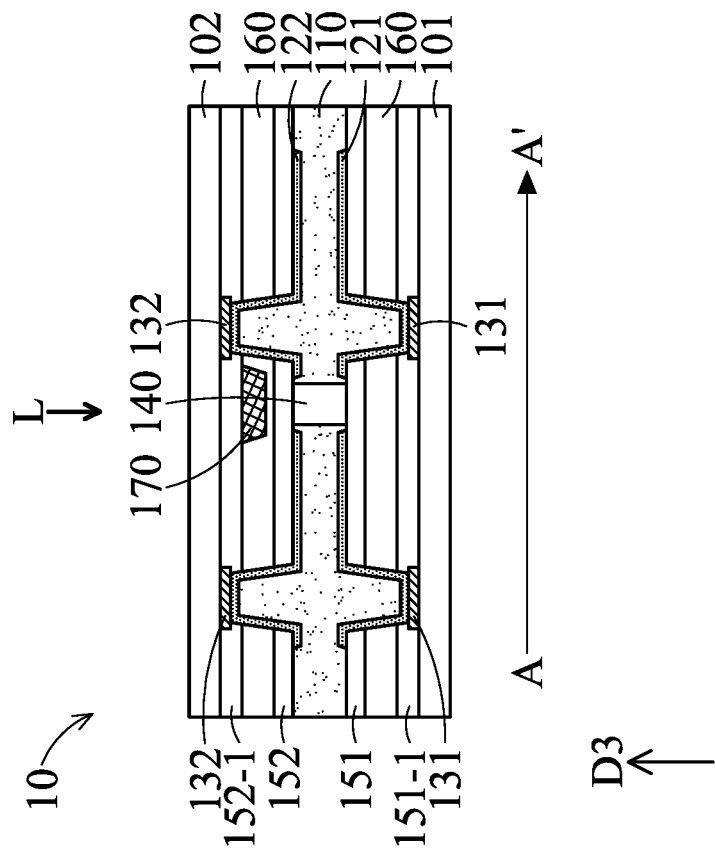
FIG. 9A
FIG. 9B

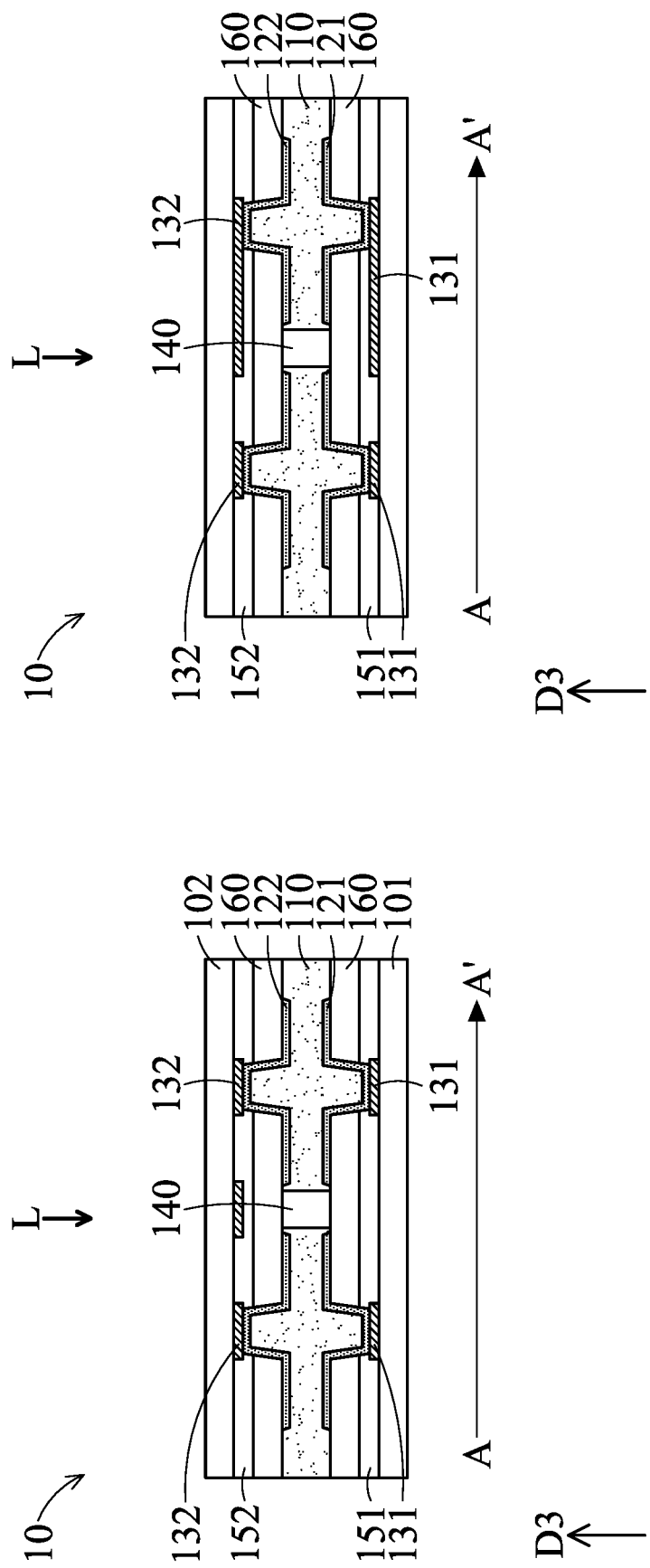

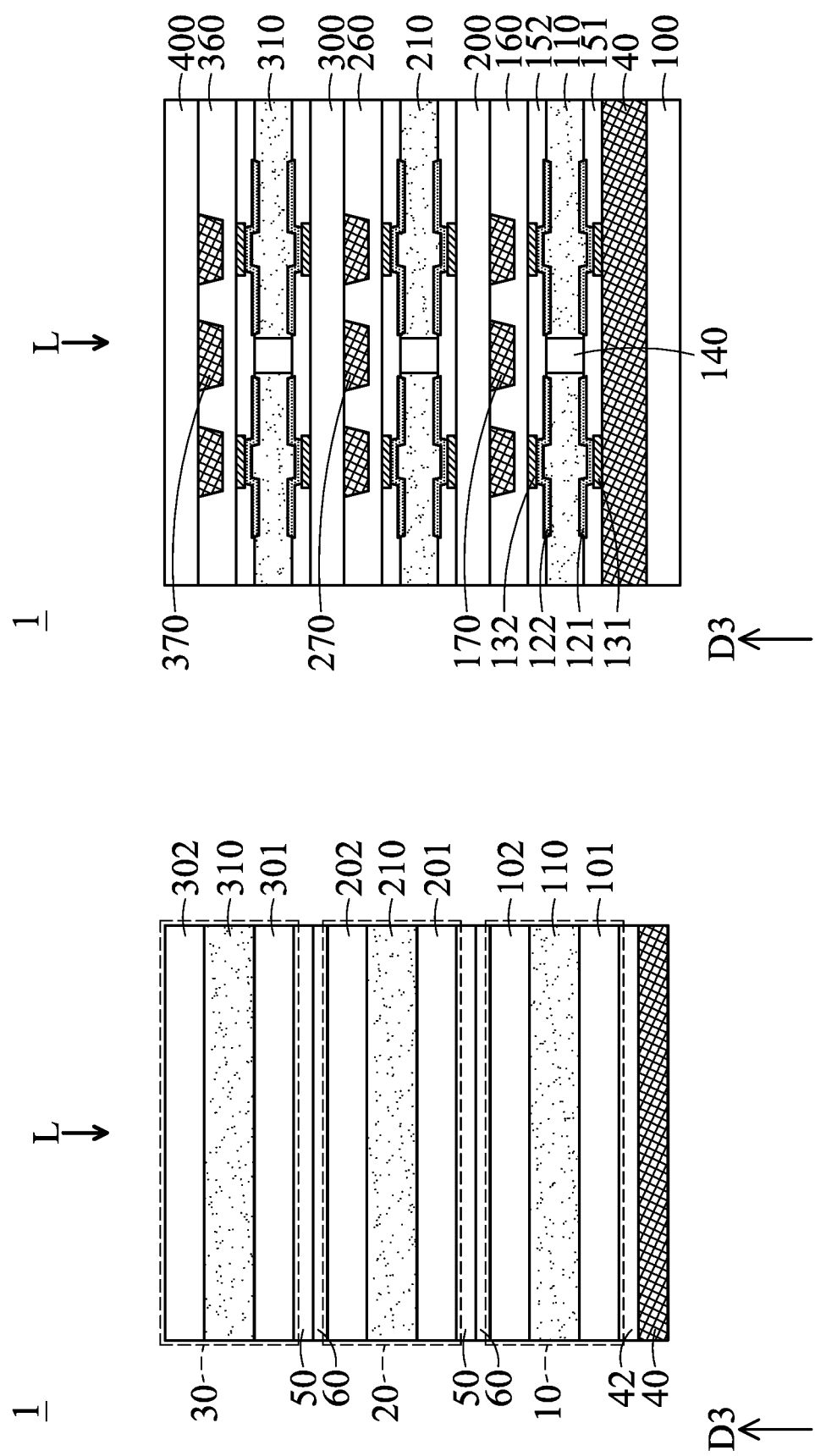

ELECTRONIC DEVICE WITH A TRANSPARENT ELECTRODE AND A SIGNAL LINE ELECTRICALLY CONNECTED THERETO

CROSS REFERENCE TO RELATED APPLICATIONS

This application claims priority of U.S. Provisional Application No. 63/323,109 filed on Mar. 24, 2022 and China Patent Application No. 202211122026.4 filed on Sep. 15, 2022, the entirety of which are incorporated by reference herein.

BACKGROUND

Technical Field

The present disclosure relates to electronic device, and in particular it relates to an electronic device including signal lines.

Description of the Related Art

In the existing panel of a reflective display, transparent conductive layers are mainly utilized as the electrodes disposed on the upper substrate or the lower substrate. Due to the large impedance of the transparent conductive layers, there will be serious RC delay in large-size or high-resolution display applications, which will affect the overall display quality.

Therefore, how to reduce the RC delay is still a topic that the industry is currently working on.

BRIEF SUMMARY

The present disclosure provides an electronic device. The electronic device includes a first panel. The first panel includes a first substrate, a second substrate, a liquid crystal layer, a first transparent electrode, a second transparent electrode, and a first signal line. The second substrate is opposite to the first substrate. The liquid crystal layer is disposed between the first substrate and the second substrate. The first transparent electrode is disposed between the first substrate and the liquid crystal layer. The second transparent electrode is disposed between the second substrate and the liquid crystal layer. The first signal line is electrically connected to the first transparent electrode and extends in the first direction. The impedance of the first signal line is less than the impedance of the first transparent electrode.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion

FIG. 9A illustrates a cross-sectional view of a panel of an electronic device corresponding to the section line AA' in FIG. 9B, in accordance with some embodiments of the present disclosure.

FIG. 9B illustrates a top view of the panel of the electronic device corresponding to FIG. 9A, in accordance with some embodiments of the present disclosure.

FIG. 10 illustrates a cross-sectional view of a panel of an electronic device, in accordance with some embodiments of the present disclosure.

FIG. 11 illustrates a cross-sectional view of a panel of an electronic device, in accordance with some embodiments of the present disclosure.

FIG. 14 illustrates a cross-sectional view of an electronic device with filter elements between panels, in accordance with some embodiments of the present disclosure.

FIG. 15 illustrates a cross-sectional view of an electronic device with shared substrates between panels, in accordance with some embodiments of the present disclosure.

DETAILED DESCRIPTION

Figures 1A, 1B:
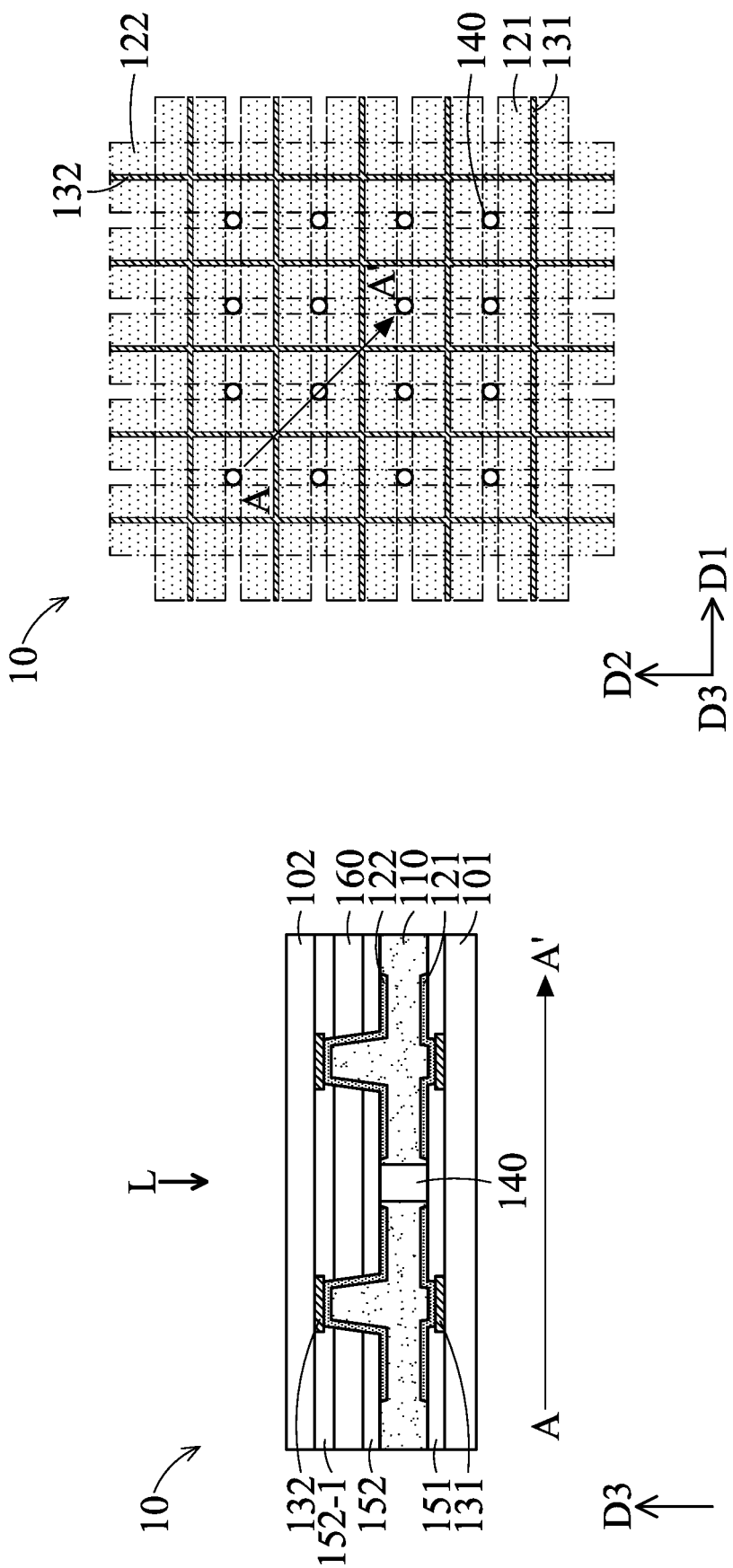
FIG. 1A illustrates a cross-sectional view of a panel of an electronic device corresponding to the section line AA' in FIG. 1B, in accordance with some embodiments of the present disclosure.
FIG. 1B illustrates a top view of the panel of the electronic device corresponding to FIG. 1A, in accordance with some embodiments of the present disclosure.

Certain terms are used throughout this disclosure and the appended claims to refer to specific components. Those skilled in the art will understand that electronic device manufacturers may refer to the same components by different names. This article does not intend to distinguish between components that have the same function but have different names. In the following description and claims, terms such as "including" and "comprising" are open-ended terms, so they should be interpreted as meaning "including but not limited to . . . ."

Directional terms mentioned in this document, such as "up", "down", "front", "rear", "left", "right", etc., only refer to the directions of the drawings. Accordingly, the directional terminology used is illustrative, not limiting, of the present disclosure. In the drawings, various figures illustrate the general characteristics of methods, structures and/or materials used in particular embodiments. However, these drawings should not be construed to define or limit the scope or properties encompassed by these embodiments. For example, the relative sizes, thicknesses and positions of various layers, regions and/or structures may be reduced or enlarged for clarity.

One structure (or layer, component, substrate) described in this disclosure is located on/above another structure (or layer, component, substrate), which can refer to two structures that are adjacent and directly connected, or it can refer to two structures that are adjacent but indirectly connected. Indirect connection means that there is at least one intermediate structure (or intermediate layer, intermediate component, intermediate substrate, intermediate space) between the two structures, and the lower surface of one structure is neighboring or directly connected to the upper surface of the intermediate structure, and the upper surface of the other structure is neighboring or directly connected to the lower surface of the intermediate structure. The intermediate structure may be composed of a single-layer or multi-layer entity structure or a non-entity structure, which is not limited. In the present disclosure, when a certain structure is disposed "over" another structure, it may mean that the certain structure is "directly" on another structure, or it means that the certain structure is "indirectly" on another structure, that is, at least one structure is sandwiched between the certain structure and another structure.

The terms "about", "equal", "equal to" or "same", "substantially" or "roughly" are generally interpreted as within 20% of a given value or range, or as within 10%, 5%, 3%, 2%, 1%, or 0.5% of a given value or range.

Furthermore, any two values or directions used for comparison may have certain errors. If the first value is equal to the second value, it implies that there may be an error of about 10% between the first value and the second value. If the first direction is perpendicular or "substantially" perpendicular to the second direction, then the angle between the first direction and the second direction may be between 80 degrees and 100 degrees. If the first direction is parallel or "substantially" parallel to the second direction, the angle between the first direction and the second direction may be between 0 degree and 10 degrees.

Ordinal numbers such as "first", "second", etc. used in the description and claims are used to modify elements, and they do not imply and represent that the (or these) elements have any preceding ordinal numbers. Also, the ordinal numbers do not represent the order of a certain element and another element, or the order of the manufacturing method. The use of these ordinal numbers is only used to make an element with a certain name be clearly distinguished from another element with the same name. The claims and the description may not use the same terms, whereby a first element in the specification may be a second element in the claims.

In the present disclosure, the Young's modulus can be measured by a Young's modulus tester or a tensile testing machine or other suitable instruments or methods, but is not limited thereto. Furthermore, the terms "a given range is from a first value to a second value", "a given range is within a range from the first value to the second value" means that the given range includes the first value, the second value and other values between the first and the second value.

In addition, the electronic devices disclosed in the present disclosure may include display devices, backlight devices, antenna devices, sensing devices, tiled devices, touch displays, curved displays, or non-rectangular electronic devices (free shape displays), but not limited to this. The electronic device may include, for example, but not limited to, liquid crystal, light-emitting diode, fluorescence, phosphor, other suitable display media, or a combination thereof. The display device may be a non-self-luminous display device or a self-luminous display device. The antenna device may be an antenna device of liquid crystal type or an antenna device of non-liquid crystal type, and the sensing device may be a sensing device for sensing capacitance, light, heat or ultrasonic waves, but not limited thereto. The tiled device may be, for example, a tiled display device or an tiled antenna device, but not limited thereto. It should be noted that, the electronic device may be any arrangement and combination of the foregoing, but not limited to this. In addition, the electronic device may be a bendable or flexible electronic device. It should be noted that, the electronic device may be any arrangement and combination of the foregoing, but not limited to this. In addition, the shape of the electronic device may be rectangular, circular, polygonal, a shape with curved edges, or other suitable shapes. The electronic device may have peripheral systems such as a driving system, a control system, a light source system, a shelf system, etc. to support the display device, the antenna device or the tiled device. For the convenience of illustration, the following description will be described in an aspect where the electronic device is taken as a backlight device, but the present disclosure is not limited to this.

It should be understood that, according to the embodiments of the present disclosure, an optical microscope (OM), a scanning electron microscope (SEM), a film thickness profiler (α-step), an ellipsometric thickness gauge, or other suitable methods may be employed to measure the depth, thickness, width or height of each element, or the spacing or distance between elements. According to some embodiments, a scanning electron microscope may be used to obtain a cross-sectional structural image including the elements to be measured, and to measure the depth, thickness, width or height of each element, or the spacing or distance between elements.

It should be noted that, in the following embodiments, the features of several different embodiments may be replaced, recombined, and mixed to complete other embodiments without departing from the spirit of the present disclosure. As long as the features of the various embodiments do not violate the spirit of the disclosure or conflict with each other, they can be mixed and matched arbitrarily.

Unless otherwise defined, all terms (including technical and scientific terms) used herein have the same meaning as commonly understood by one of ordinary skill in the art to which this disclosure belongs. It is to be understood that these terms, such as those defined in commonly used dictionaries, should be construed to have meanings consistent with the relevant art and the background or context of the present disclosure, and should not be construed in an idealized or overly formal manner, unless otherwise defined in the embodiments of the present disclosure.

Some embodiments of the disclosure are described below, and additional steps may be provided before, during, and/or after the various stages described in these embodiments. Some of the described stages may be replaced or eliminated in different embodiments. Semiconductor device structures may add additional components. Some of the described components may be replaced or eliminated in different embodiments. Although some of the embodiments discussed are performed in a particular order of steps, the steps may be performed in another logical order.

It should be understood that the electronic device of the present disclosure may include a package element, a display device, an antenna device, a touch display device, a curved display device or a non-rectangular display device (free shape display), but not limited to this. The electronic device may be a bendable or flexible electronic device. The electronic device may include, for example, but not limited to, light-emitting diodes, liquid crystals, fluorescence, phosphors, other suitable display media, or a combination thereof. The light-emitting diodes may include, for example, organic light-emitting diodes (OLEDs), inorganic light-emitting diodes (LEDs), mini-light-emitting diodes (mini LEDs), micro-light-emitting diodes (micro-LEDs), quantum dots (QDs) light-emitting diodes (such as QLEDs, QDLEDs), other suitable materials or an arbitrary combination thereof, but not limited to. The display device may include, for example, but is not limited to, a tiled display device. The concepts or principles of the present disclosure may also be applied to non-self-luminous liquid crystal displays (LCDs), but are not limited thereto.

The antenna device may be, for example, a liquid crystal antenna or other kinds of antenna types, but is not limited thereto. The antenna device may include, for example, but is not limited to, a tiled antenna device. It should be noted that, the electronic device may be any arrangement or combination of the foregoing, but is not limited to this. In addition, the shape of the electronic device may be rectangular, circular, polygonal, a shape with curved edges, or other suitable shapes. The electronic device may have peripheral systems such as a driving system, a control system, a light source system, and a shelf system to support the display device, the antenna device or the tiled device. The electronic device of the present disclosure may be, for example, a display device, but is not limited thereto.

According to some embodiments of the electronic device of the present disclosure, a signal line is included in the electronic device (such as a cholesteric liquid crystal display), wherein the signal line is electrically connected to a transparent electrode and extends in a certain direction. In addition, since the impedance of the signal line is less than the impedance of the transparent electrode, the transport of the signal among the pixels in the panel may be improved to reduce RC delay. In some embodiments, by forming the signal line as having a light absorbing property or disposing a light-shielding structure in the electronic device, the reflection from the signal line may be reduced to improve the display quality of the electronic device.

FIGS. 1A and 1B are respectively a cross-sectional view and a top view of a first panel 10 of the electronic device according to some embodiments of the present disclosure, wherein FIG. 1A is a cross-sectional view in the direction of the section line AA' in FIG. 1B. The first panel 10 includes a first substrate 101 and a second substrate 102, and the second substrate 102 is disposed opposite to the first substrate 101. The first panel 10 further includes a liquid crystal layer 110 disposed between the first substrate 101 and the second substrate 102. As shown in FIG. 1A, the first panel 10 further includes a first transparent electrode 121 disposed between the first substrate 101 and the liquid crystal layer 110. The first panel 10 further includes a second transparent electrode 122 disposed between the second substrate 102 and the liquid crystal layer 110. The first panel 10 further includes a first signal line 131 electrically connected to the first transparent electrode 121 and extending in a first direction D1, and the impedance of the first signal line 131 is less than that of the first transparent electrode 121. As shown in FIG. 1A, an arrow L indicates the path of the incident light or the direction of the viewing angle. The second transparent electrode 122 may overlap the first transparent electrode 121.

In some embodiments, the first substrate 101 and/or the second substrate 102 may include a transparent material. In some embodiments, the first substrate 101 and/or the second substrate 102 may include a rigid substrate or a flexible substrate, such as glass, ceramic, polyimide (PI), polyethylene terephthalate (PET), other suitable materials, or a combination of the above materials, but not limited thereto. The material of the liquid crystal layer 110 may include, for example, cholesteric liquid crystal, other suitable liquid crystal materials, or a combination of the above materials, but is not limited thereto.

The first transparent electrode 121 and the second transparent electrode 122 are used to control the arrangement of liquid crystal molecules in the liquid crystal layer 110. For example, the first transparent electrode 121 and the second transparent electrode 122 can switch the state of the liquid crystal layer 110 to a reflective state, a transmissive state or a gray-scale state through the driving of a voltage. In some embodiments, the first transparent electrode 121 and the second transparent electrode 122 may include any suitable transparent conductive material.

Referring to FIG. 1B, the first transparent electrode 121 and the second transparent electrode 122 extend in directions perpendicular to each other, respectively, but not limited thereto. In other embodiments, an acute angle may be formed between the extending direction of the first transparent electrode 121 (for example, the first direction D1) and the extending direction of the second transparent electrode 122 (for example, the second direction D2), and the acute angle is, for example, between 55° to 90°. As shown in FIG. 1B, the overlapping portion of the first transparent electrode 121 and the second transparent electrode 122 may be defined as the pixel area of the first panel 10. It should be noted that in FIG. 1A and other cross-sectional views of the first panel 10 of the present disclosure, only two pixels in the direction of the section line AA' are shown, and adjacent pixels are not shown for simplicity.

In some embodiments, the first panel 10 further includes a second signal line 132, the second signal line 132 is electrically connected to the second transparent electrode 122 and extends along a second direction D2, and the impedance of the second signal line 132 is less than the impedance of the second transparent electrode 122. Referring to FIG. 1B, the first signal line 131 and the second signal line 132 extend in directions perpendicular to each other, respectively, but not limited thereto. In other embodiments, an acute angle may be formed between the extension direction of the first signal line 131 (e.g., the first direction D1) and the extension direction of the second signal line 132 (e.g., the second direction D2), and the acute angle is, for example, 55° to 90°.

Although in the embodiment of FIGS. 1A and 1B, the first signal line 131 and/or the second signal line 132 are respectively disposed close to the center of the overlapping portion of the first transparent electrode 121 and the second transparent electrode 122, it is not limited to this. In other embodiments (as discussed below with reference to FIGS. 2A and 2B), the first signal line 131 and/or the second signal line 132 may also be disposed close to the edge of the overlapping portion of the first transparent electrode 121 and the second transparent electrode 122, respectively.

In some embodiments, the first signal line 131 and the second signal line 132 are disposed on the first substrate 101 and the second substrate 102, respectively, and are electrically connected to an external circuit for providing a bias voltage. Compared with the conventional panel that does not have signal lines between pixels, the panel of the present disclosure can transmit electrical signals to the pixels connected to the signal lines by using the signal lines with lower impedance than that of the transparent electrodes, thereby reducing the RC delay of the electronic device.

In some embodiments, the first signal line 131 and/or the second signal line 132 include a metal material, such as aluminum, copper, chromium, other suitable materials, or a combination thereof, but not limited thereto. In some embodiments, the first signal line 131 and/or the second signal line 132 have a light absorbing property, thereby reducing the light reflection from the signal lines when the electronic device is used. The first signal line 131 and/or the second signal line 132 may be blackened metal with the light absorbing property resulted from a blackening treatment, but not limited thereto.

Figure 1C:
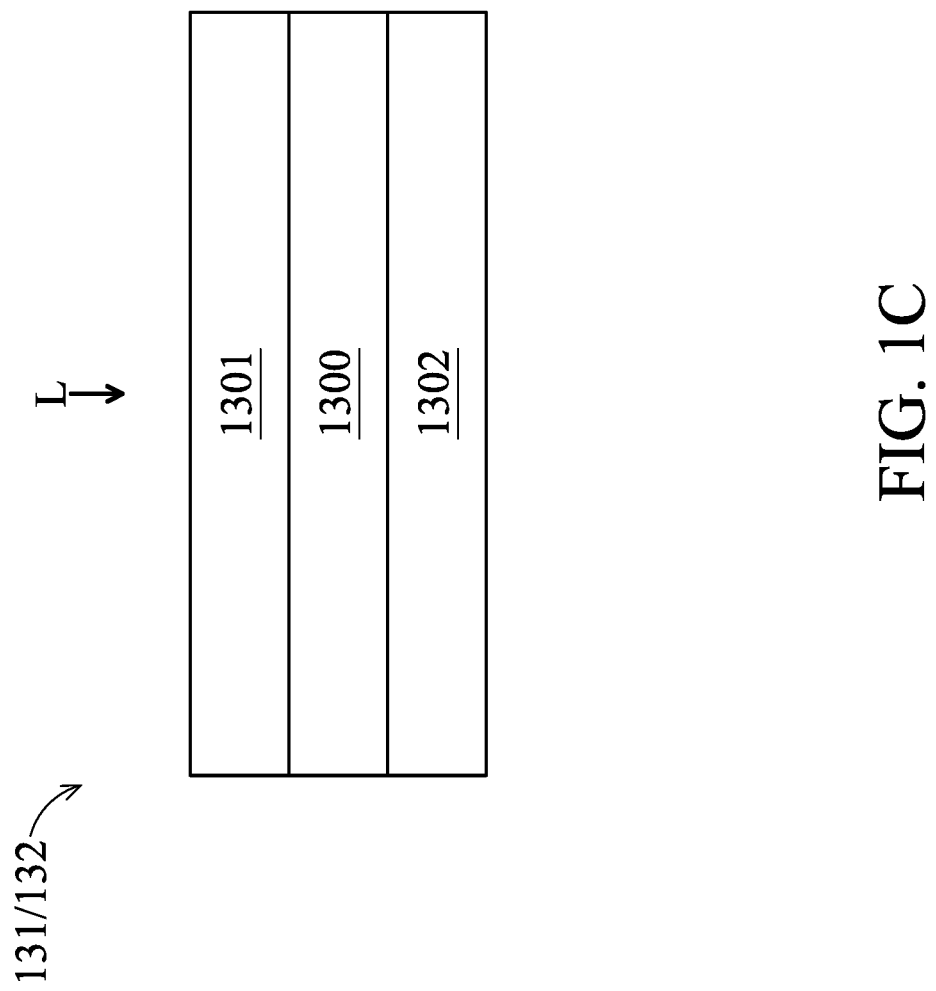
FIG. 1C illustrates a cross-sectional view of an exemplary blackened metal, in accordance with some embodiments of the present disclosure.

FIG. 1C is a cross-sectional view of an exemplary blackened metal, wherein arrow L indicates the path or viewing angle of the incident light (e.g., ambient light), in accordance with some embodiments of the present disclosure. In other words, the second substrate 102 is closer to the viewer than the first substrate 101. In some embodiments, the first signal line 131 and/or the second signal line 132 may include a metal line 1300 for transmitting a signal, which includes a metal material, such as aluminum, copper, chromium, other suitable materials, or a combination of the above materials, but not limited to this.

In some embodiments, as shown in FIG. 1C, the first signal line 131 and/or the second signal line 132 may further include a conductive layer 1301 and a conductive layer 1302, and the conductive layer 1301 and the conductive layer 1302 may be, for example, disposed on both sides of the metal line 1300, respectively, but not limited thereto. In some other embodiments, the conductive layer 1301 is disposed on the side of the metal line 1300 facing the incident light. The conductive layer 1301 can reduce the reflection of incident light through the signal line or increase the adhesion between the first signal line 131 and/or the second signal line 132 and the substrates. The conductive layer 1302 can reduce the internal reflection in the panel or increase the adhesion between the first signal line 131 and/or the second signal line 132 and the substrates.

The conductive layer 1301 or the conductive layer 1302 may include a material for adjusting the refractive index of the signal lines, such as silicon oxynitride ($SiN_xO_y$), yttrium oxide ($Y_2O_3$) alloy, chromium oxide ($Cr_2O_3$), other suitable materials or a combination of the above materials, but not limited thereto. For example, in embodiments where the metal line 1300 includes aluminum, the conductive layer 1302 or conductive layer 1301 including silicon oxynitride ($SiN_xO_y$) may be used, but not limited thereto. In embodiments where the metal line 1300 includes copper, the conductive layer 1302 or conductive layer 1301 including an yttrium oxide powder ($Y_2O_3$) alloy is used, but not limited thereto. In embodiments where the metal line 1300 includes chromium, the conductive layer 1302 or conductive layer 1301 including chromium trioxide ($Cr_2O_3$) is used, but not limited thereto.

In some embodiments, as shown in FIG. 1A, a spacer structure 140 is disposed between the first substrate 101 and the second substrate 102, and the spacer structure 140 is between the first transparent electrodes 121 of neighboring pixels and between the second transparent electrodes 122 of neighboring pixels. In some embodiments, as shown in FIG. 1B, the spacer structure 140 does not overlap the first transparent electrode 121 and/or the second transparent electrode 122 in a top view direction D3. In some embodiments, the material of the spacer structure 140 may include organic materials, other suitable materials, or a combination of the above materials, but is not limited thereto.

In some embodiments, as shown in FIG. 1A, the first panel 10 further includes a first insulating layer 151, and the first insulating layer 151 is between the first transparent electrode 121 and the first signal line 131, and the first transparent electrode 121 is electrically connected to the first signal line 131 through a via passing through the first insulating layer 151. In some embodiments, as shown in FIG. 1A, the first panel 10 further includes a second insulating layer 152 and another second insulating layer 152-1, and the second insulating layer 152 and another second insulating layer 152-1 are between the second transparent electrode 122 and the second signal line 132, and the second transparent electrode 122 is electrically connected to the second signal line 132 through a via passing through the second insulating layer 152 and another second insulating layer 152-1.

By disposing the above-mentioned insulating layers in the first panel 10, the liquid crystal layer 130, the first signal line 131 and/or the second signal line 132 in the first panel 10 can be protected from moisture from the outside. The first insulating layer 151 and/or the second insulating layer 152 may include, but not limited to, silicon nitride, silicon oxynitride, silicon oxycarbonitride, other suitable materials or a combination of the above materials.

In some embodiments, the first panel 10 further includes an optical layer 160 between the second transparent electrode and the second signal line 132, but not limited to. In other embodiments, the optical layer 160 may be disposed between the first substrate 101 and the second substrate 102 according to requirements. In some embodiments, the optical layer 160 may be between the first transparent electrode 121 and the first signal line 131, but not limited to. In some embodiments, the optical layer 160 is between the second transparent electrode 122 and the second substrate 102, or between the first transparent electrode 121 and the first substrate 101. In some embodiments, the optical layer 160 includes a filter layer which includes a filtering material with a specific filtering wavelength band. In some embodiments, the optical layer 160 may include an organic layer or an inorganic layer without filtering function. In some embodiments, the optical layer 160 may include a scattering layer, an optical clear adhesive, or the like.

It should be noted that, for simplicity, in FIG. 1B and some other top views of the panel 10 of the present disclosure, only the first transparent electrode 121, the second transparent electrode 122, the first signal line 131, the second signal line 132, the spacer structure 140, and the light-shielding structure (as discussed in the following embodiments) are shown, but elements such as the substrate, the insulating layers, and the filter layer are not shown.

By arranging a signal line with lower impedance in the panel, the transmission of the signal between the pixels in the panel can be improved to reduce the RC delay. By forming the signal line to have a light absorbing property, the reflection of the external light through the signal line can be reduced, thereby improving the quality of the electronic device. The electronic device of the above embodiments can reduce the RC delay problem while maintaining optical performance.

Figure 2B:
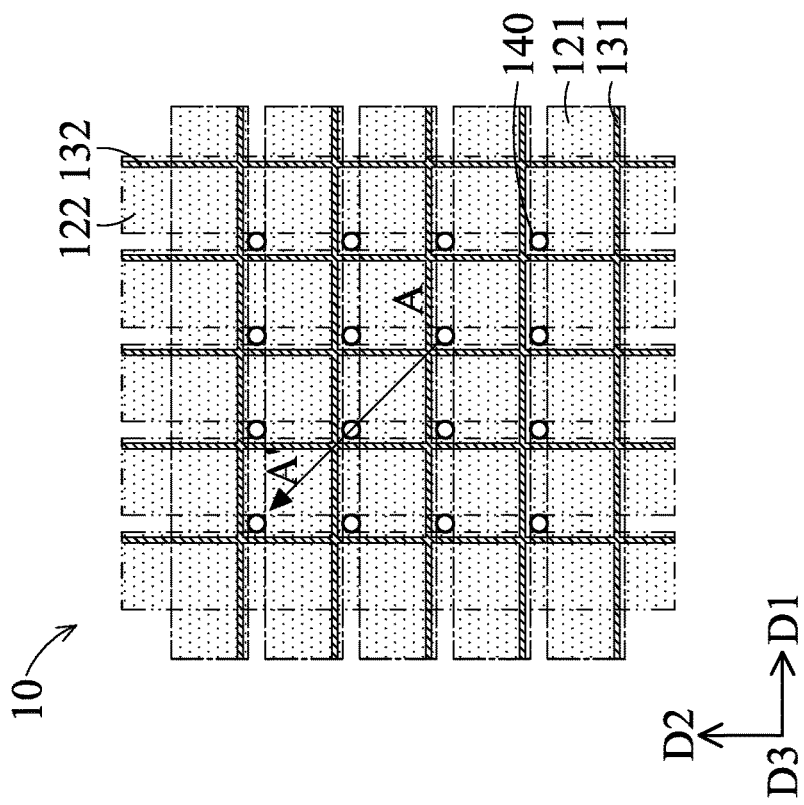
FIG. 2B illustrates a top view of the panel of the electronic device corresponding to FIG. 2A, in accordance with some embodiments of the present disclosure.
Figure 2A:
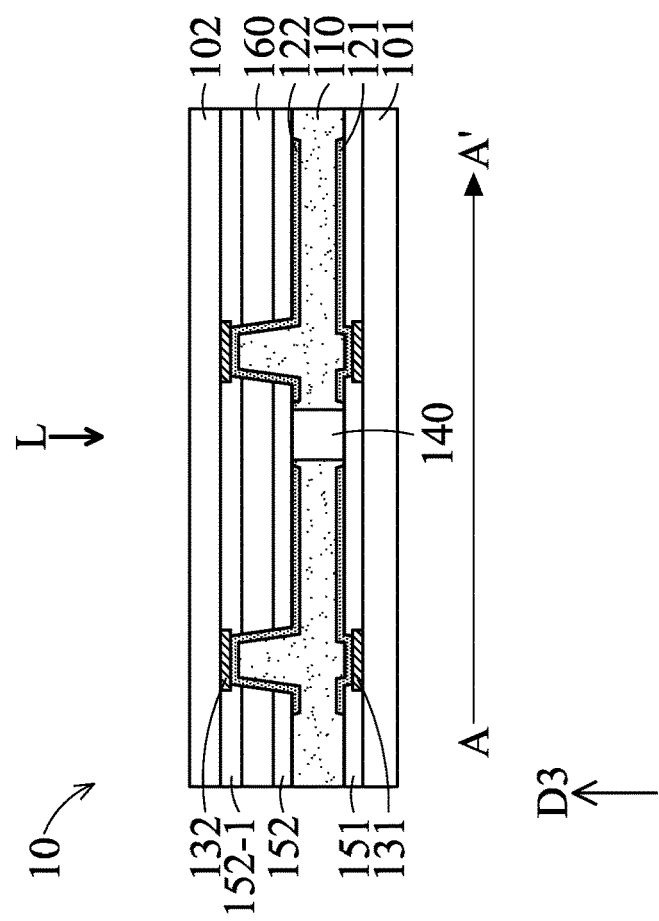
FIG. 2A illustrates a cross-sectional view of a panel of an electronic device corresponding to the section line AA' in FIG. 2B, in accordance with some embodiments of the present disclosure.

FIGS. 2A and 2B illustrate a cross-sectional view and a top view of the panel 10 of the electronic device, respectively, in accordance with some embodiments of the present disclosure, wherein FIG. 2A is a cross-sectional view in the direction of the section line AA' in FIG. 2B. The embodiment shown in FIGS. 2A and 2B is similar to the embodiment shown in FIGS. 1A and 1B, and the difference is that the first signal line 131 and/or the second signal line 132 are arranged close to the edges of the overlapping portions of the first transparent electrode 121 and the second signal line 132, respectively, in FIGS. 2A and 2B. In some embodiments, the first signal line 131 and/or the second signal line 132 are disposed at the edges of each pixel and adjacent to the spacer structure 140. In some embodiments, the first signal line 131 and/or the second signal line 132 may include a blackened metal.

Figure 3:
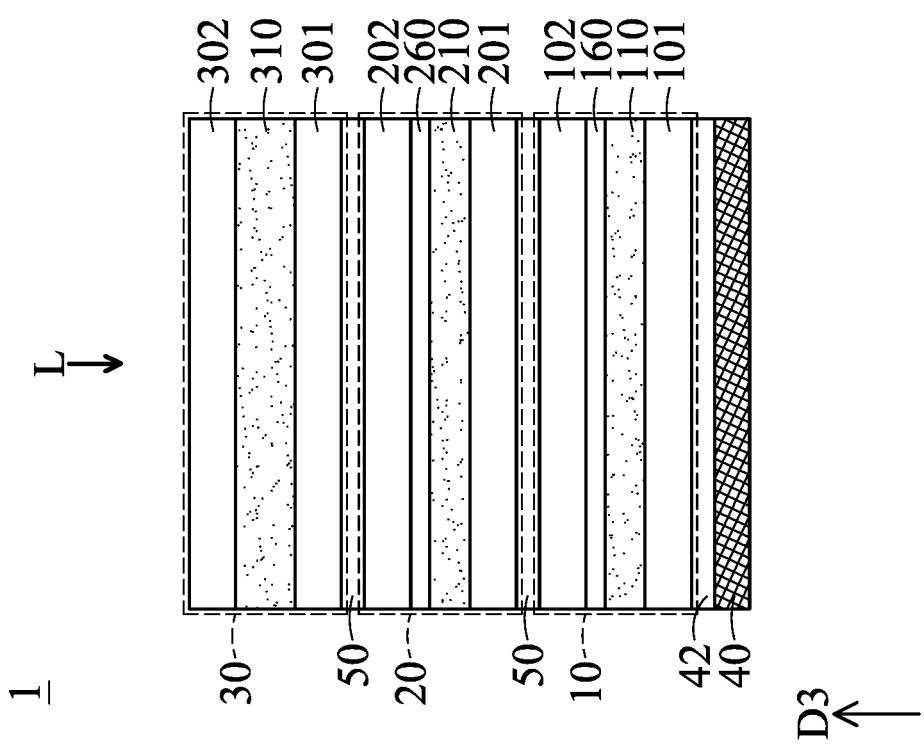
FIG. 3 illustrates a cross-sectional view of an electronic device including a stack of panels, in accordance with some embodiments of the present disclosure.

FIG. 3 is a cross-sectional view of the electronic device 1 including a stack of the first panel 10, the second panel 20 and/or the third panel 30, in accordance with some embodiments of the present disclosure, and the arrow L indicates the path of the incident light or the viewing direction. In other words, the second panel 20 is disposed on the first panel 10, and the third panel 30 is disposed on the second panel 20. The first panel 10 includes a first substrate 101, a second substrate 102, and a liquid crystal layer 110 disposed between the first substrate 101 and the second substrate 102. The second panel 20 is disposed on the first panel 10 and includes a first substrate 201, a second substrate 202, and a liquid crystal layer 210 disposed between the first substrate 201 and the second substrate 202. The third panel 30 is disposed on the second panel 20 and includes a first substrate 301, a second substrate 302, and a liquid crystal layer 310 disposed between the first substrate 301 and the second substrate 302. In some embodiments, the optical layer 160 may be disposed between the liquid crystal layer 110 and the liquid crystal layer 210. In some embodiments, the optical layer 260 may be disposed between the liquid crystal layer 210 and the liquid crystal layer 310. In some embodiments, the optical layer 160 and/or the optical layer 260 are respectively provided on the light-receiving side (i.e., adjacent to the viewing surface) of the liquid crystal layer 110 and/or the liquid crystal layer 210.

In some embodiments, the liquid crystal layer 110, the liquid crystal layer 210, and the liquid crystal layer 310 may be liquid crystal layers with different reflection wavelengths, and one of ordinary skill in the art may appropriately select the material of the liquid crystal layer 110, the liquid crystal layer 210, and the liquid crystal layer 310. For example, the reflection wavelength of the liquid crystal layer 110 may be in the red light band, the reflection wavelength of the liquid crystal layer 210 may be in the green light band, and the reflection wavelength of the liquid crystal layer 310 may be in the blue light band. The present disclosure does not limit the stacking sequence of the liquid crystal layers corresponding to different reflection wavelengths.

For the sake of simplicity, other elements other than the substrate, the liquid crystal layer and the optical layer in each panel are not shown in FIG. 3. In some embodiments, the optical layer 160 and/or the optical layer 260 may include filter layers of different colors. In some embodiments, the optical layer 160 may include a red-green light layer, and the optical layer 260 may include a yellow-green light layer, but not limited thereto. In addition, although the optical layer is not shown in the third panel 30 in this embodiment, in fact, the third panel 30 may also include transparent optical glue or similar materials without filtering function.

In some embodiments, a light absorbing layer 40 may be disposed under the first panel 10. The light absorbing layer 40 may include a light absorbing substrate, such as a black substrate, or a light absorbing material layer (e.g., black ink or other suitable materials) formed on a substrate, but not limited thereto. In some embodiments, a refractive index matching film 42 may be disposed between the light absorbing layer 40 and the first panel 10, thereby reducing interface reflection in the electronic device 1. In other embodiments, the refractive index matching film 42 may not be disposed between the light absorbing layer 40 and the first panel 10.

In some embodiments, an adhesive layer 50 may be disposed between the first panel 10 and the second panel 20, and/or between the second panel 20 and the third panel 30, thereby fixing the different panels to each other. In some embodiments, the adhesive layer 50 may include transparent optical glue or other suitable materials, but is not limited thereto. By disposing a transparent glue with haze in the electronic device 1, the moire pattern can be reduced, but not limited to this.

Figure 4:
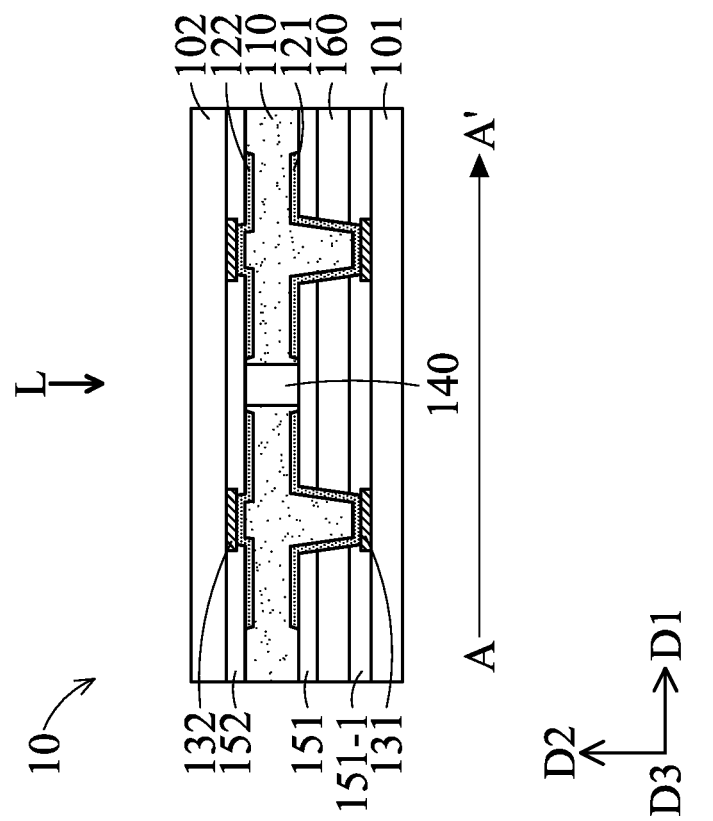
FIG. 4 illustrates a cross-sectional view of the panel of the electronic device corresponding to the section line AA' in FIG. 1B, in accordance with some embodiments of the present disclosure.

FIG. 4 is a cross-sectional view of the panel of the electronic device corresponding to line AA' of FIG. 1B, in accordance with some embodiments of the present disclosure. The difference from the embodiments shown in FIG. 1A is that, in the embodiments shown in FIG. 4, the optical layer 160 is disposed between the liquid crystal layer 110 and the first substrate 101. In some embodiments, the optical layer 160 may be disposed, for example, between the first insulating layer 151 and the first substrate 101. In this embodiment, the material of the optical layer 160 is similar to that described in the above discussion, and the first signal line 131 and the second signal line 132 may also be disposed close to the edge of the overlapping region of the first transparent electrode 121 and the second transparent electrode 122, respectively, which is similar to the embodiments of FIGS. 2A and 2 and will not be described here. In some embodiments, as shown in FIG. 4, the first panel 10 includes a second insulating layer 152, the second insulating layer 152 is between the second transparent electrode 122 and the second signal line 132, and the second transparent electrode 122 is electrically connected to the second signal line 132 through the via passing through the second insulating layer 152. In some embodiments, as shown in FIG. 4, the first panel 10 includes a first insulating layer 151 and another first insulating layer 151-1, and the first insulating layer 151 and another first insulating layer 151-1 are between the first transparent electrode 121 and the first signal line 131, and the first transparent electrode 121 is electrically connected to the first signal line 131 through a via passing through the first insulating layer 151 and another first insulating layer 151-1. In some embodiments, the first signal line 131 and/or the second signal line 132 may include blackened metal.

Figure 5:
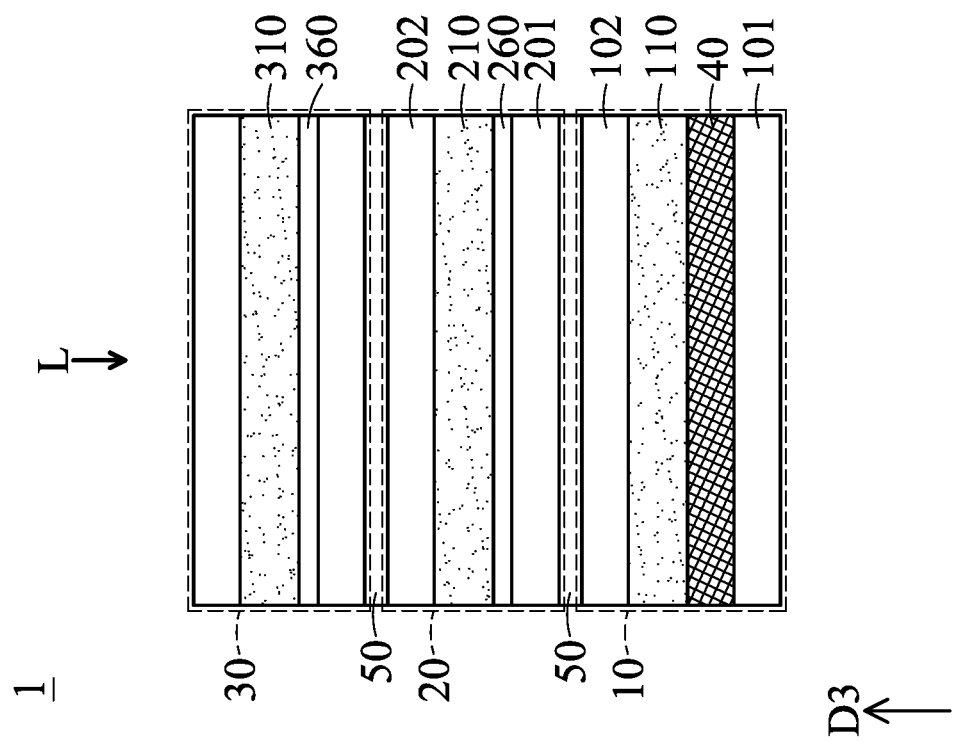
FIG. 5 illustrates a cross-sectional view of an electronic device including a stack of panels, in accordance with some embodiments of the present disclosure.

FIG. 5 illustrates a cross-sectional view of an electronic device 1 including a stack of the first panel 10, the second panel 20, and the third panel 30, in accordance with some embodiments of the present disclosure. It should be understood that elements similar to those shown in FIG. 3 are included in FIG. 5, and these elements will be designated by the same reference numerals. As shown in FIG. 5, in some embodiments, an optical layer 260 and an optical layer 360 are disposed in the second panel 20 and the third panel 30, respectively, and the optical layer 260 and the optical layer 360 are on the backlight side of the liquid crystal layer 210 and the liquid crystal layer 310, respectively. In some embodiments, the optical layer 260 and the optical layer 360 are filter layers with different colors. In some embodiments, the optical layer 360 may be a yellow filter layer, and the optical layer 260 may be a red filter layer. As shown in FIG. 5, the filter light-absorbing layer 40 may be disposed in the first panel 10.

Figure 6A:
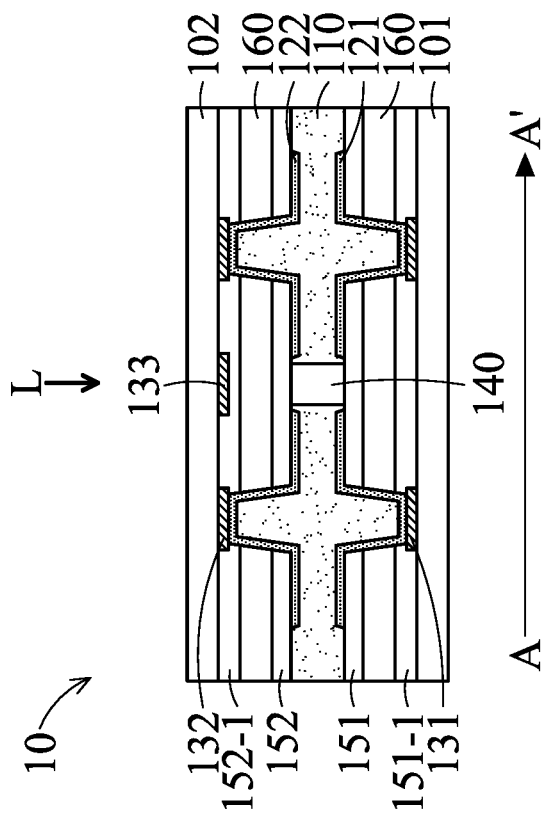
FIG. 6A illustrates a cross-sectional view of a panel of an electronic device corresponding to the section line AA' in FIG. 6B, in accordance with some embodiments of the present disclosure.
Figure 6B:
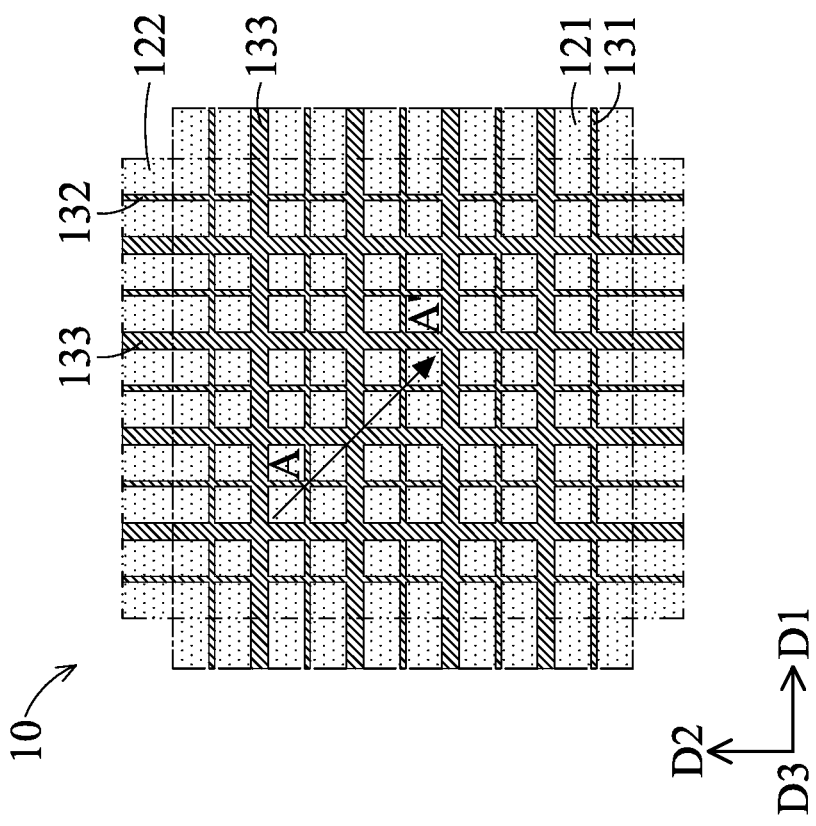
FIG. 6B illustrates a top view of the panel of the electronic device corresponding to FIG. 6A, in accordance with some embodiments of the present disclosure.

FIGS. 6A and 6B are respectively a cross-sectional view and a top view of the panel 10 of an electronic device, in accordance with some embodiments of the present disclosure, wherein FIG. 6A is a cross-sectional view in the direction of the section line AA' in FIG. 6B. It should be understood that FIGS. 6A and 6B include elements similar to those shown in FIGS. 1A and 1B, and these elements will be designated by the same reference numerals. In some embodiments, a light-shielding structure 133 is formed over the spacer structure 140. As shown in FIG. 6B, the light-shielding structure 133 may selectively overlap a portion of the first transparent electrode 121 and a portion of the second transparent electrode 122, and the light-shielding structure 133 may extend, for example, substantially parallel to the direction of the first transparent electrode 121 and/or the direction of the second transparent electrode 122. Since the liquid crystal in the portion of the liquid crystal layer 110 that does not overlap with the first transparent electrode 121 and the second transparent electrode 122 may not be rotated by the bias voltage, for example, the bias voltage between the first transparent electrode 121 and the second transparent electrode 122. Therefore, by disposing the light-shielding structure 133, the dark state light leakage from the liquid crystal layer 110 where the liquid crystal is not rotated by the bias voltage can be shielded. The light-shielding structure 133 may include materials similar to or different from those of the first signal line 131 and the second signal line 132, and the description is not repeated here. The light-shielding structure 133 may be formed in the same process as the first signal line 131 and/or the second signal line 132, but is not limited thereto.

Although only the light-shielding structure 133 between the second substrate 102 and the liquid crystal layer 110 is shown in FIG. 6A, in other embodiments, the light-shielding structure 133 may be further disposed between the first substrate 101 and the liquid crystal layer 110, thereby reducing internal reflections within the electronic device. In some embodiments, the optical layer 160 may be disposed, for example, between the first insulating layer 151 and another first insulating layer 151-1. In some embodiments, the optical layer 160 may be disposed, for example, between the second insulating layer 152 and another second insulating layer 152-1. The optical layer 160 may include a transparent optical glue, a filter layer with a filtering function, other suitable materials, or a combination of the above materials, but is not limited thereto. In some embodiments, the width of the light-shielding structure 133 may be the same or different from the width of the first signal line 131 and/or the width of the second signal line 132 in a cross-section. In some embodiments, the light-shielding structure 133 may be, for example, a grid shape in a top view. In some embodiments, the first signal line 131 and/or the second signal line 132 may include blackened metal.

Figure 7B:
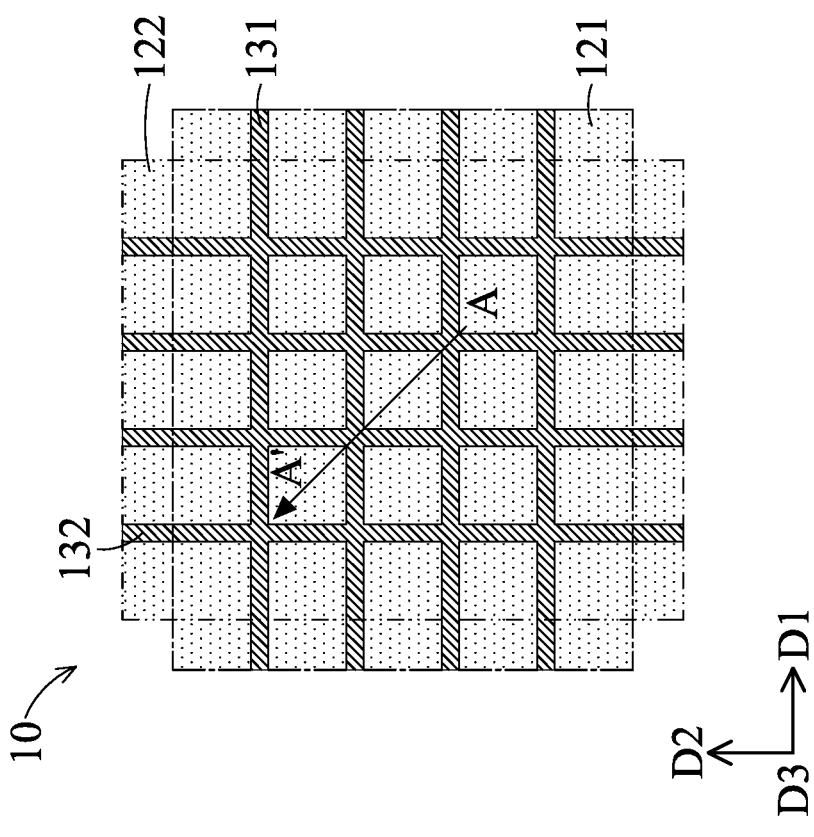
FIG. 7B illustrates a top view of the panel of the electronic device corresponding to FIG. 7A, in accordance with some embodiments of the present disclosure.
Figure 7A:
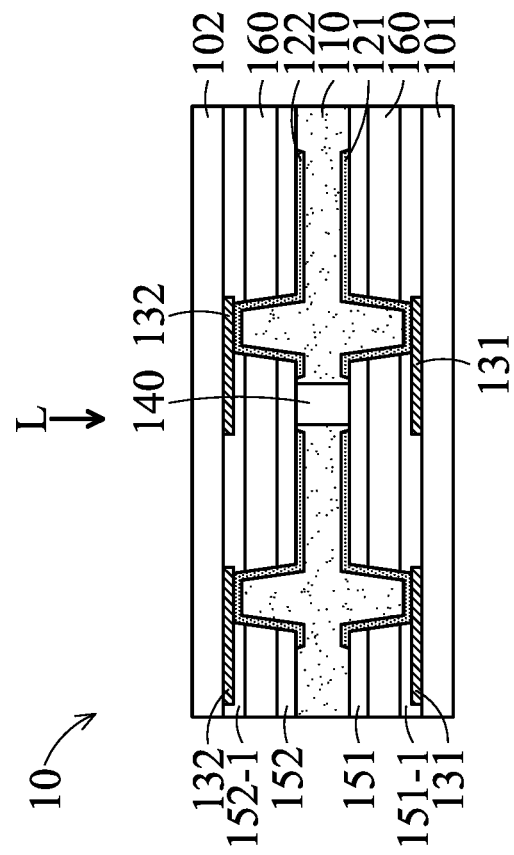
FIG. 7A illustrates a cross-sectional view of a panel of an electronic device corresponding to the section line AA' in FIG. 7B, in accordance with some embodiments of the present disclosure.

FIGS. 7A and 7B are respectively a cross-sectional view and a top view of the panel 10 of an electronic device, in accordance with some embodiments of the present disclosure, wherein FIG. 7A is a cross-sectional view in the direction of the section line AA' in FIG. 7B. It should be understood that FIGS. 7A, 7B include elements similar to those shown in FIGS. 2A, 2B, and these elements will be designated by the same reference numerals. In some embodiments, as shown in FIGS. 7A and 7B, the spacer structure 140 is disposed between the first substrate 101 and the second substrate 102. In the top view direction D3, the first signal line 131 and/or the second signal line 132 overlap with the spacer structure 140, for example. In some embodiments, the optical layer 160 is disposed between the first insulating layer 151 and another first insulating layer 151-1, or the optical layer 160 is disposed between the second insulating layer 152 and another second insulating layer 152-1. In some embodiments, the optical layer 160, the first insulating layer 151 and/or another first insulating layer 151-1 are disposed between the first transparent electrode 121 and the first signal line 131, thereby reducing the crosstalk between the first transparent electrode 121 and the first signal line 131. In some embodiments, the optical layer 160, the second insulating layer 152 and/or another second insulating layer 152-1 are disposed between the second transparent electrode 122 and the second signal line 132, thereby reducing the crosstalk between the second transparent electrode 122 and the second signal line 132. In some embodiments, the first signal line 131 and/or the second signal line 132 may include blackened metal.

Figure 8A:
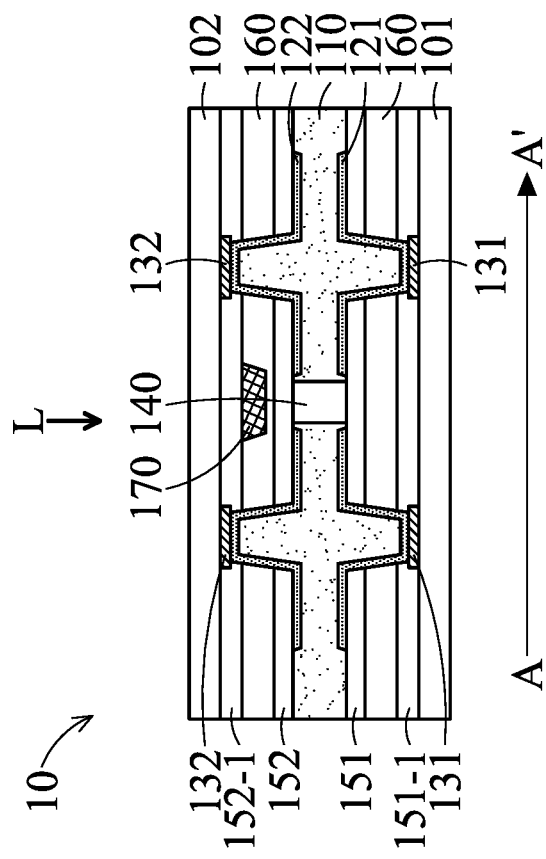
FIG. 8A illustrates a cross-sectional view of a panel of an electronic device corresponding to the section line AA' in FIG. 8B, in accordance with some embodiments of the present disclosure.
Figure 8B:
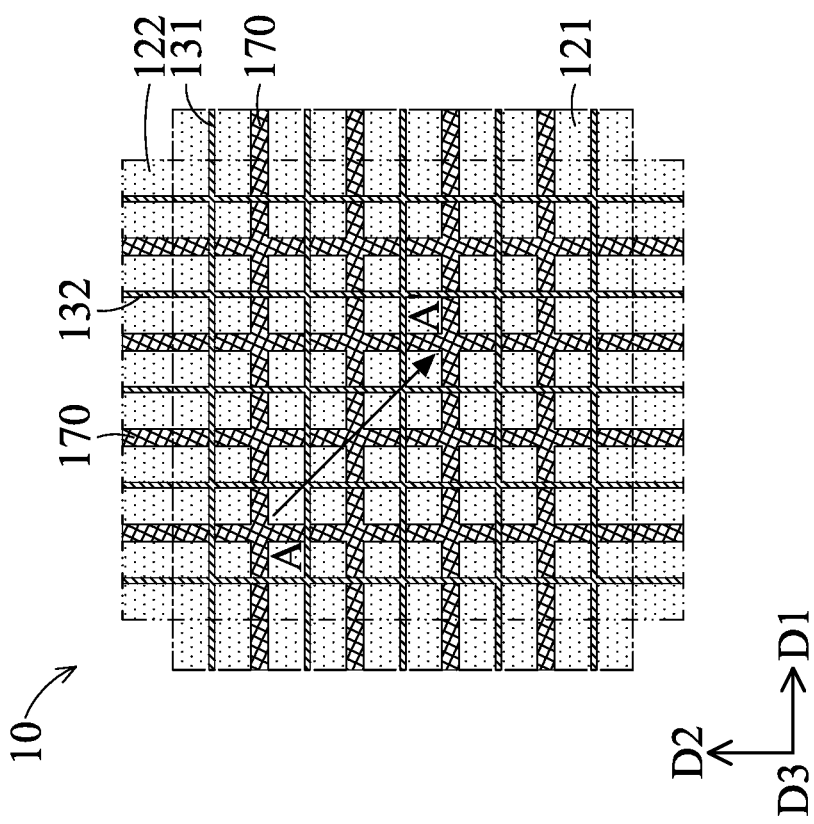
FIG. 8B illustrates a top view of the panel of the electronic device corresponding to FIG. 8A, in accordance with some embodiments of the present disclosure.

Next, refer to FIGS. 8A and 8B. It should be understood that elements in FIGS. 8A and 8B that include similar elements to those shown in FIGS. 1A, 1B will be designated by the same reference numerals. In some embodiments, the light-shielding structure 170 may overlap the spacer structure 140. As shown in FIG. 8B, the light-shielding structure 170 may selectively overlap or not overlap the overlapping portion of the first transparent electrode 121 and the second transparent electrode 122, for example. The extending direction of the light-shielding structure 170 may be parallel to the extending direction of the first transparent electrode 121 (e.g., the first direction D1) and/or the extending direction of the second transparent electrode 122 (e.g., the second direction D2). Since the liquid crystal in the portion of the liquid crystal layer 110 that does not overlap with the first transparent electrode 121 and the second transparent electrode 122 may not be rotated by the bias voltage, for example, the bias voltage between the first transparent electrode 121 and the second transparent electrode 122. Therefore, by disposing the light-shielding structure 170, the dark state light leakage from the liquid crystal layer 110 can be shielded.

The light-shielding structure 170 may include a light absorbing material, such as black ink, black photoresist, or other suitable materials, but is not limited thereto. In the top view direction D3 (as shown in FIG. 8B), the light-shielding structure 170 is, for example, grid-shaped, but not limited thereto. In a cross-section, the width of the light-shielding structure 170 may be greater than or equal to the width of the first signal line 131, for example. In a cross-section, the width of the light-shielding structure 170 may be greater than or equal to the width of the second signal line 132, for example. In a cross-section, the width of the light-shielding structure 170 may be greater than or equal to the width of the spacer structure 140. In some embodiments, the first signal line 131 and/or the second signal line 132 may include a blackened metal material.

Next, refer to FIGS. 9A and 9B. FIGS. 9A and 9B include elements similar to those shown in FIGS. 8A and 8B, and these elements will be designated by the same reference numerals. The difference from FIGS. 8A and 8B is that the first signal line 131 and/or the second signal line 132 in FIGS. 9A and 9B may be disposed close to the edge of the overlapping region of the first transparent electrode 121 and the second transparent electrode 122, respectively. In some embodiments, the first signal line 131 and/or the second signal line 132 may include a blackened metal material.

Next, refer to FIG. 10. In FIG. 10, the optical layer 160 may be disposed between the first insulating layer 151 and the first transparent electrode 121 (or the liquid crystal layer 110), or the optical layer 160 may be disposed between the second insulating layer 152 and the second transparent electrode 122 (or the liquid crystal layer 110). By omitting the configuration of insulating layers between the optical layer 160 and the liquid crystal layer 110, the thickness of the first panel 10 can be reduced and the manufacturing cost can be saved. In some embodiments, the first signal line 131 and/or the second signal line 132 may include a blackened metal material.

Next, refer to FIG. 11. The first signal line 131 and/or the second signal line 132 are respectively disposed close to the edge of the overlapping portion of the first transparent electrode 121 and the second transparent electrode 122. The optical layer 160 may be disposed between the first insulating layer 151 and the first transparent electrode 121 (or the liquid crystal layer 110), or the optical layer 160 may be disposed between the second insulating layer 152 and the second transparent electrode 122 (or the liquid crystal layer 110). By omitting the configuration of insulating layers between the optical layer 160 and the liquid crystal layer 110, the thickness of the first panel 10 can be reduced and the manufacturing cost can be saved.

Figures 12A, 12B:
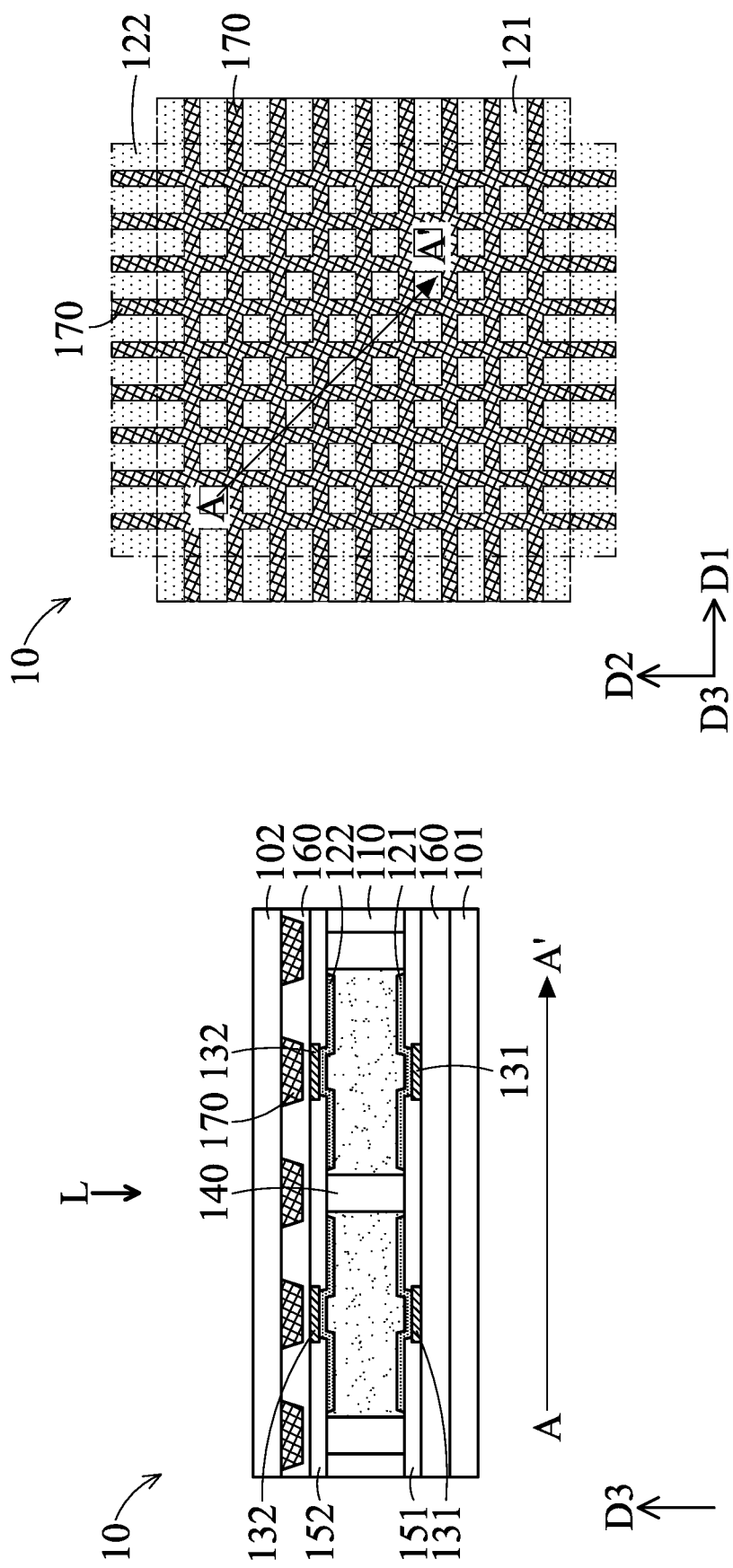
FIG. 12A illustrates a cross-sectional view of a panel of an electronic device corresponding to the section line AA' in FIG. 12B, in accordance with some embodiments of the present disclosure.
FIG. 12B illustrates a top view of the panel of the electronic device corresponding to FIG. 12A, in accordance with some embodiments of the present disclosure.

FIGS. 12A and 12B are respectively a cross-sectional view and a top view of the panel 10 of an electronic device, in accordance with some embodiments of the present disclosure, wherein FIG. 12A is a cross-sectional view in the direction of the section line AA' in FIG. 12B. In some embodiments, the light-shielding structure 170 is disposed between the first signal line 131 and the second substrate 102, and the light-shielding structure 170 overlaps the first signal line 131 and/or the second signal line 132 in the top view direction D3. In some embodiments, the light-shielding structure 170 is disposed over the first signal line 131 and the second signal line 132.

Figure 13B:
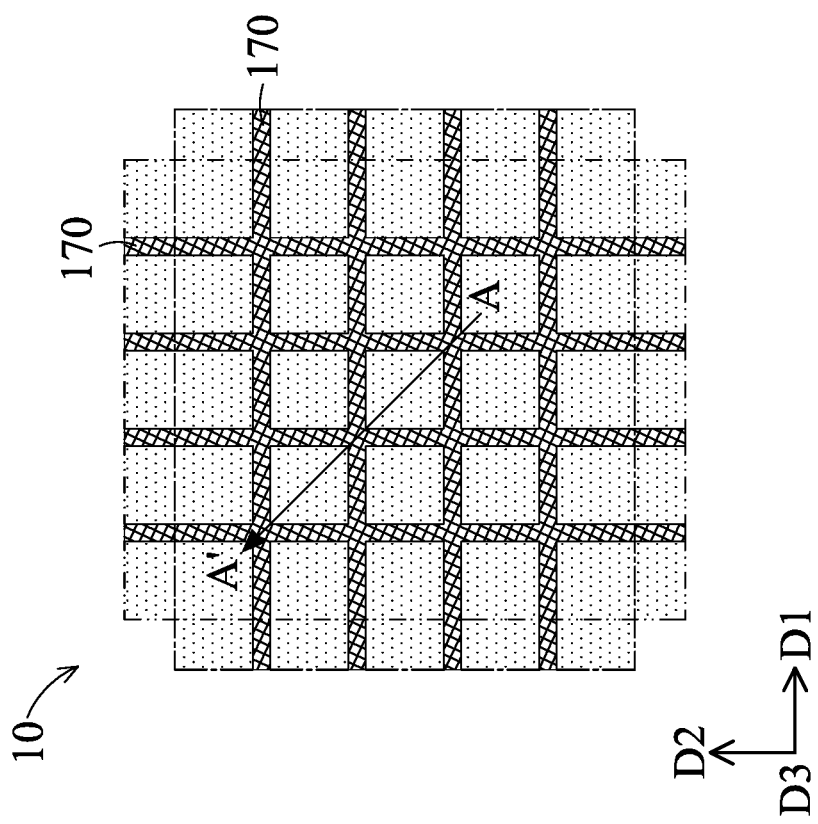
FIG. 13B illustrates a top view of the panel of the electronic device corresponding to FIG. 13A, in accordance with some embodiments of the present disclosure.

In the embodiments in which the light-shielding structure 170 is over the first signal line 131 and the second signal line 132, since the light-shielding structure 170 can shield the reflection from the first signal line 131 and/or the second signal line 132, the first signal line 131 and/or the second signal line 132 may not be subjected to the blackening treatment (e.g., the conductive layer 1301 and the conductive layer 1302 in FIG. 2 are not included), for example, but not limited thereto. Since the light-shielding structure 170 overlaps the first signal line 131 and/or the second signal line 132, the first signal line 131 and/or the second signal line 132 are, for example, shielded by the light-shielding structure 170 in FIG. 13B, so no signal line (first signal line 131 and/or second signal line 132) is shown in FIG. 13B. In some embodiments, in the top view direction D3, the light-shielding structure 170 may have a grid shape.

Figure 13A:
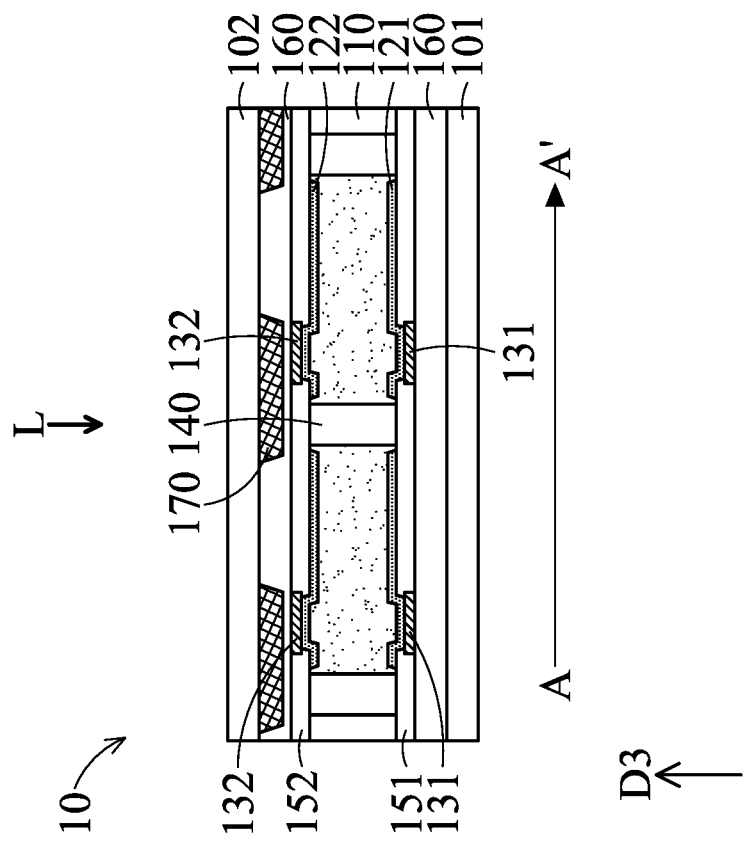
FIG. 13A illustrates a cross-sectional view of a panel of an electronic device corresponding to the section line AA' in FIG. 13B, in accordance with some embodiments of the present disclosure.

Then, refer to FIGS. 13A and 13B. The difference from the embodiments shown in FIGS. 12A and 12B is that the first signal line 131 and/or the second signal line 132 in FIGS. 13A and 13B may be disposed close to the edge of the overlapping region of the first transparent electrode 121 and the second transparent electrode 122, respectively. Elements similar to those shown in FIGS. 12A and 12B are included in FIGS. 13A and 13B, and these elements are designated by the same reference numerals.

Refer to FIGS. 12A and 13A, the light-shielding structure 170 may be disposed on the side of the second substrate 102 adjacent to the first substrate 101, and the optical layer 160 may be disposed in the gap between the patterns of the light-shielding structure 170. In some embodiments, the optical layer 160 may cover the surface of the light-shielding structure 170 away from the second substrate 102. In some embodiments, the optical layer 160 may be unpatterned, for example. Due to the adhesion between the optical layer 160 and the material of the light-shielding structure 170, the optical layer 160 is not easy to peel off from the second substrate 102. In some embodiments, the optical layer 160 may be selectively disposed between the first substrate 101 and the first insulating layer 151 (or the first signal line 131). In some embodiments, the optical layer 160 may or may not be in contact with the first substrate 101. In some embodiments, other layers (e.g., insulating layers) may be selectively added between the optical layer 160 and the first substrate 101.

In addition, although not shown in FIGS. 12A and 13A, the light-shielding structure may also be disposed between the first signal line 131 and the first substrate 101.

Referring to FIG. 5 again, it should be noted that when the light presented by the liquid crystal layer 310 in the third panel 30 in the reflective state is blue light, when the light presented by the liquid crystal layer 210 in the second panel 20 in the reflective state is green light, and when the light presented by the liquid crystal layer 110 in the first panel 10 in the reflective state is red light, the optical layer 360 located between the liquid crystal layer 310 and the liquid crystal layer 210 may be, for example, a yellow filter element, the optical layer 160 located between the liquid crystal layer 210 and the liquid crystal layer 110 may be, for example, a red filter element, but not limited thereto. It should be noted that although the above-mentioned embodiments only illustrate the stacking structure of the first panel 10, the second panel 20 and the third panel 30 may also have a stacking structure similar to the first panel 10. It should be noted that the stacking structure of the first panel 10, the stacking structure of the second panel 20 and the stacking structure of the third panel 30 may respectively adopt stacking structures from different drawings, and the stacking structures of the three panels are not limited to be the same.

Next, refer to FIG. 14. In some embodiments, a filter element 60 (e.g., a filter layer or filtering glue) may be disposed between neighboring panels of the electronic device 1. As shown in FIG. 14, in some embodiments, the filter element 60 is disposed between the first panel 10 and the second panel 20, or the filter element 60 is disposed between the second panel 20 and the third panel 30, but not limited to this. In some embodiments, when the light presented by the liquid crystal layer 310 in the third panel 30 in the reflective state is blue light, and the light presented by the liquid crystal layer 210 in the second panel 20 in the reflective state is green light, and when the light presented by the liquid crystal layer 110 in the first panel 10 in the reflective state is red light, the filter element 60 between the second panel 20 and the third panel 30 may be, for example, a yellow filter element, and the filter element 60 between the second panel 20 and the first panel 10 may be, for example, a red filter element, but not limited thereto.

In some embodiments, an adhesive layer 50 is disposed between the first panel 10 and the second panel 20, and an adhesive layer 50 is provided between the second panel 20 and the third panel 30. Although the filter elements 60 is disposed on the backlight side of the adhesive layers 50 (i.e., the side close to the light absorbing layer 40) in FIG. 14, for example, a filter element 60 is disposed between the adhesive layer 50 and the second panel 20, and another filter element 60 is disposed between the adhesive layer 50 and the first panel 10, and the present disclosure is not limited thereto. In fact, the filter element 60 may also be disposed on the light-receiving side of the adhesive layer 50 (i.e., the side away from the light-absorbing layer 40), or a portion of the filter elements 60 may be disposed in the panel, depending on the design requirements of the electronic device 1. In some embodiments, the light absorption layer 40 may also be disposed in the first panel 10, but the light absorption layer 40 needs to be disposed under the liquid crystal layer 110. In the embodiment in which the filter elements 60 are disposed between the panels, the cross-sectional views of each panel are similar to those described in the above discussion, and are not repeated here.

FIG. 15 is a cross-sectional view illustrating an electronic device 1 having a common substrate between panels, in accordance with some embodiments of the present disclosure. The electronic device 1 in FIG. 15 shows three panels stacked on top of each other, and the electronic device 1 includes the substrate 100, the substrate 200, the substrate 300 and the substrate 400. As shown in FIG. 15, the liquid crystal layer 110 is disposed between the substrates 100 and 200, the liquid crystal layer 210 is disposed between the substrates 200 and 300, and the liquid crystal layer 310 is disposed between the substrates 300 and 400, for example. The liquid crystal layer 110 and the liquid crystal layer 210 share the substrate 200, and the liquid crystal layer 210 and the liquid crystal layer 310 share the substrate 300. With the above-mentioned design with common substrates, the bonding process for forming the electronic device 1 can be reduced or the overall thickness of the electronic device 1 can be reduced. In some embodiments, there is an optical layer 160 between the substrate 100 and the substrate 200, an optical layer 260 between the substrate 200 and the substrate 300, and an optical layer 360 between the substrate 300 and the substrate 400. The optical layer 160, the optical layer 260 and/or the optical layer 360 may include a filter layer or an optical clear adhesive with no filtering function, or a similar material.

It should be appreciated that similar elements are included within the various panels in FIG. 15 and these elements will be designated by similar reference numerals. It should be noted that although the optical layer 160, the optical layer 260, the optical layer 360 and the light-shielding structure 170, the light-shielding structure 270, and the light-shielding structure 370 are shown in each panel in FIG. 15, and each panel has similar configurations, the present disclosure is not limited to this. In fact, one of ordinary skill in the art may decide the configuration within each panel according to requirements.

In summary, according to some embodiments of the electronic device of the present disclosure, a signal line that is electrically connected to a transparent electrode and that extends in a certain direction is included in the electronic device (such as a cholesteric liquid crystal display). In addition, since the impedance of the signal line is less than the impedance of the transparent electrode, the transport of the signal among the pixels in the panel may be improved to reduce RC delay. In some embodiments, by forming the signal line as having a light absorbing property or disposing a light-shielding structure in the electronic device, the reflection from the signal line may be reduced to improve the display quality of the electronic device.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An electronic device, comprising:
a first panel comprising:
a first substrate;
a second substrate disposed opposite to the first substrate;
a liquid crystal layer disposed between the first substrate and the second substrate;
a spacer structure disposed between the first substrate and the second substrate;
a plurality of first transparent electrodes disposed between the first substrate and the liquid crystal layer, and extending along a first direction;
a plurality of second transparent electrodes disposed between the second substrate and the liquid crystal layer;
a plurality of first signal lines respectively electrically connected to the plurality of first transparent electrodes and extending along the first direction, wherein an impedance of one of the plurality of first signal lines is less than an impedance of one of the plurality of first transparent electrodes; and
a second signal line electrically connected to one of the plurality of second transparent electrodes and extending in a second direction, wherein the first direction is different from the second direction, and an impedance of the second signal line is less than an impedance of one of the plurality of second transparent electrodes,
wherein a width of one of the plurality of first signal lines is greater than a width of the spacer structure,
wherein in a top view of the electronic device, the spacer structure is disposed between adjacent ones of the plurality of first transparent electrodes.

2. The electronic device as claimed in claim 1, wherein the first panel further comprises:
a first insulating layer between the plurality of first transparent electrodes and the plurality of first signal lines, wherein one of the plurality of first transparent electrodes is electrically connected to one of the plurality of first signal lines through a via in the first insulating layer.

3. The electronic device as claimed in claim 1, wherein the first panel further comprises:
a second insulating layer between the plurality of second transparent electrodes and the second signal line, wherein one of the plurality of second transparent electrodes is electrically connected to the second signal line through a via in the second insulating layer.

4. The electronic device as claimed in claim 1, wherein the first panel further comprises:
an optical layer between the plurality of second transparent electrodes and the second substrate or between the plurality of first transparent electrodes and the first substrate.

5. The electronic device as claimed in claim 1, wherein one of the plurality of first signal lines and the second signal line overlap the spacer structure.

6. The electronic device as claimed in claim 1, wherein the first panel further comprises:
a light-shielding structure disposed between the plurality of first signal lines and the second substrate and overlapping the plurality of first signal lines and the second signal line.

7. The electronic device as claimed in claim 1, wherein one of the plurality of first signal lines comprises a metal material.

8. The electronic device as claimed in claim 1, wherein one of the plurality of first signal lines has a light absorbing property.

9. The electronic device as claimed in claim 1, further comprising:
a second panel disposed over the first panel,
wherein the second panel comprises a second liquid crystal layer, and the second liquid crystal layer has a different reflection wavelength from the liquid crystal layer.

10. An electronic device, comprising:
a first panel and a second panel each comprising:
a first substrate;
a second substrate disposed opposite to the first substrate;
a liquid crystal layer disposed between the first substrate and the second substrate;
a spacer structure disposed between the first substrate and the second substrate;
a plurality of first transparent electrodes disposed between the first substrate and the liquid crystal layer, and extending along a first direction;
a plurality of second transparent electrodes disposed between the second substrate and the liquid crystal layer;
a plurality of first signal lines respectively electrically connected to the plurality of first transparent electrodes and extending along the first direction, wherein an impedance of one of the plurality of first signal lines is less than an impedance of one of the plurality of first transparent electrodes; and
a second signal line electrically connected to one of the plurality of second transparent electrodes and extending in a second direction, wherein the first direction is different from the second direction, and an impedance of the second signal line is less than an impedance of one of the plurality of second transparent electrodes,
wherein a width of one of the plurality of first signal lines is greater than a width of the spacer structure,
wherein in a top view of the electronic device, the spacer structure is disposed between adjacent ones of the plurality of first transparent electrodes.

11. The electronic device as claimed in claim 10, wherein the first and the second panels each further comprises:
a first insulating layer between the plurality of first transparent electrodes and the plurality of first signal lines, wherein one of the plurality of first transparent electrodes is electrically connected to one of the plurality of first signal lines through a via in the first insulating layer.

12. The electronic device as claimed in claim 10, wherein the first and the second panels each further comprises:
a second insulating layer between the plurality of second transparent electrodes and the second signal line, wherein one of the plurality of second transparent electrodes is electrically connected to the second signal line through a via in the second insulating layer.

13. The electronic device as claimed in claim 10, wherein the first and the second panels each further comprises:
an optical layer between the plurality of second transparent electrodes and the second substrate or between the plurality of first transparent electrodes and the first substrate.

14. The electronic device as claimed in claim 10, wherein one of the plurality of first signal lines and the second signal line overlap the spacer structure.

15. The electronic device as claimed in claim 10, wherein the first and the second panels each further comprises:
a light-shielding structure disposed between the plurality of first signal lines and the second substrate and overlapping the plurality of first signal lines and the second signal line.

16. The electronic device as claimed in claim 10, wherein one of the plurality of first signal lines comprises a metal material.

17. The electronic device as claimed in claim 10, wherein one of the plurality of first signal lines has a light absorbing property.

18. The electronic device as claimed in claim 10, wherein there is a filter layer between the first panel and the second panel.

* * * * *